UNITED STATES PATENT OFFICE.

AMANDA OWEN, OF WILLIAMSPORT, PENNSYLVANIA.

IMPROVEMENT IN MEDICAL COMPOUNDS.

Specification forming part of Letters Patent No. 200,331, dated February 12, 1878; application filed August 31, 1877.

*To all whom it may concern:*

Be it known that I, Mrs. AMANDA OWEN, of Williamsport, in the county of Lycoming and State of Pennsylvania, have invented certain new and useful Improvements in Medical Compounds; and I do hereby declare that the following is a full, clear, and exact description thereof, which will enable others skilled in the art to which it appertains to make and use the same.

My invention relates to a medical compound for the cure of coughs, colds, and general debility, and which will also act as an appetizer and tonic, and as an invigorator for the system.

Its component parts and the method of preparing it are as follows: I take of flowers of hops, three pounds; bark of wild cherry, (finely powdered,) three pounds; buds of balm of Gilead, two pounds; flowers of chamomile, two pounds; stalks of *Absinthium*, (wormwood,) three pounds; bark of *Xanthoxylum*, (prickly-ash,) two pounds; finely-powdered roots of *Aralia nudicaulis*, (spikenard,) from which the pith has been extracted, three pounds; and raspings of quassia, two pounds. This I macerate with a sufficient quantity of water—say about six gallons—for from six to twenty-four hours. I then drain off the water, add fresh water, (so as to get all the strength of the materials,) macerate again, and drain off the water. I then strain the water, and boil it down, by a gentle heat, until about one-third has evaporated, leaving, say, eight gallons. I then add sugar enough to sweeten and preserve the decoction, and of tar, six ounces, and of spirit anisius, (anise,) four ounces, the tar having first been separately macerated with water or alcohol to dissolve it, when it is ready for use.

The action of no one of these ingredients interferes with that of any other one, and each has a slightly different action in the right direction.

The medicinal compound herein described I have found to be a most valuable tonic expectorant for relieving irritable and harassing coughs, whether they be due to pulmonary, cathartic, or to gastric affections, or to a combination of all. When given in doses of from a table-spoonful to half a wine-glassful, four times a day, it will be found to relieve in almost every instance.

Having thus described my invention, I claim and desire to secure by Letters Patent of the United States—

The medicinal compound herein described, consisting of a decoction of flowers of hops, bark of wild cherry, buds of balm of Gilead, flowers of chamomile, stalks of wormwood, bark of prickly-ash, roots of spikenard, with pith extracted, and raspings of quassia, sugar, tar, and spirits of anise, in about the proportions herein specified, for the purposes set forth.

In testimony that I claim the foregoing as my own I have hereto affixed my signature in presence of two witnesses.

AMANDA OWEN.

Witnesses:
 W. R. HULL, M. D.,
 J. B. DUBLE.